Oct. 12, 1965   C. E. GLASS   3,211,308
SELF-UNLOADING TRUCK BODY
Filed May 7, 1964   4 Sheets-Sheet 1

INVENTOR
CLARENCE E. GLASS
BY
Duck & Zarley
ATTORNEYS

Oct. 12, 1965    C. E. GLASS    3,211,308
SELF-UNLOADING TRUCK BODY
Filed May 7, 1964    4 Sheets-Sheet 2
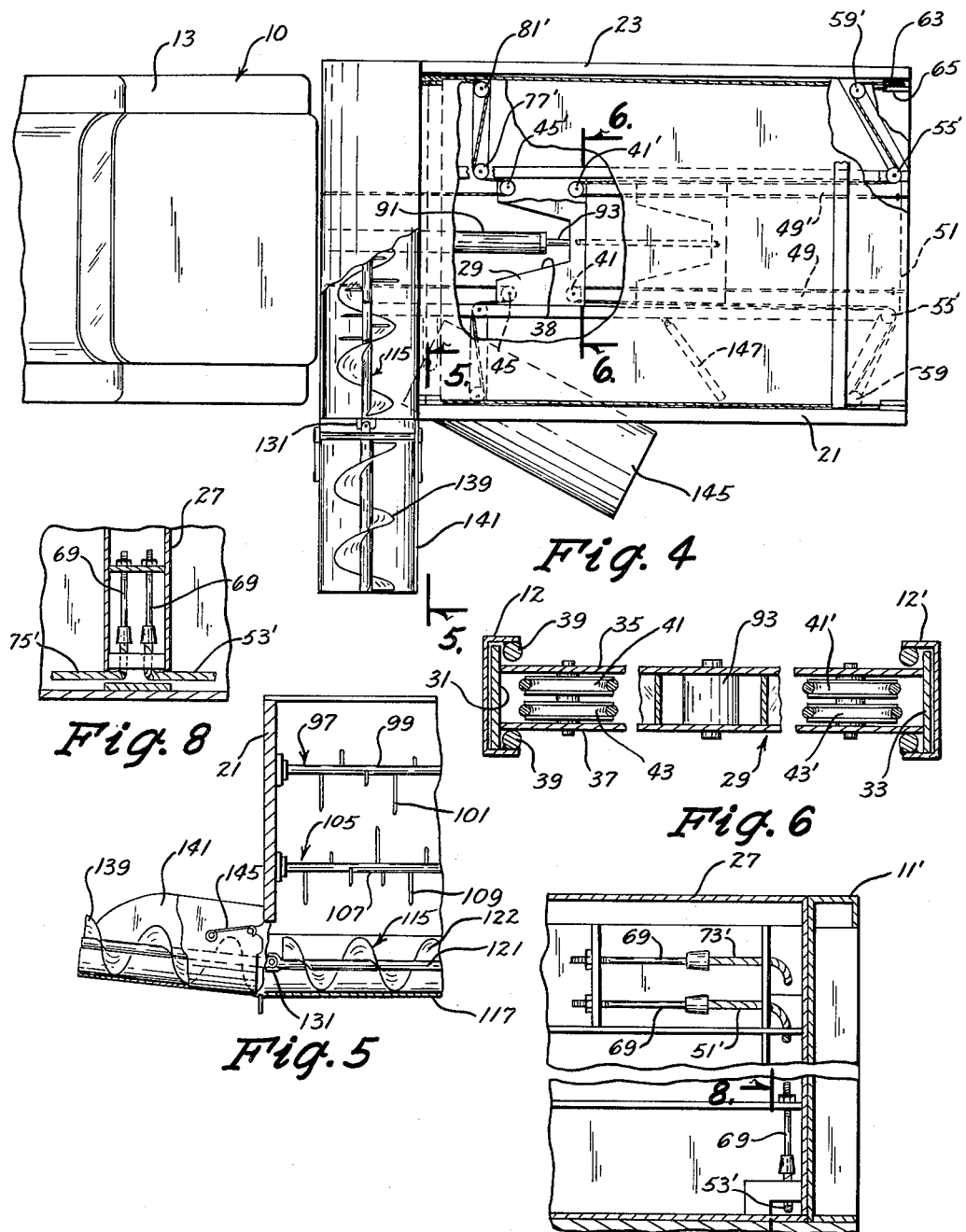

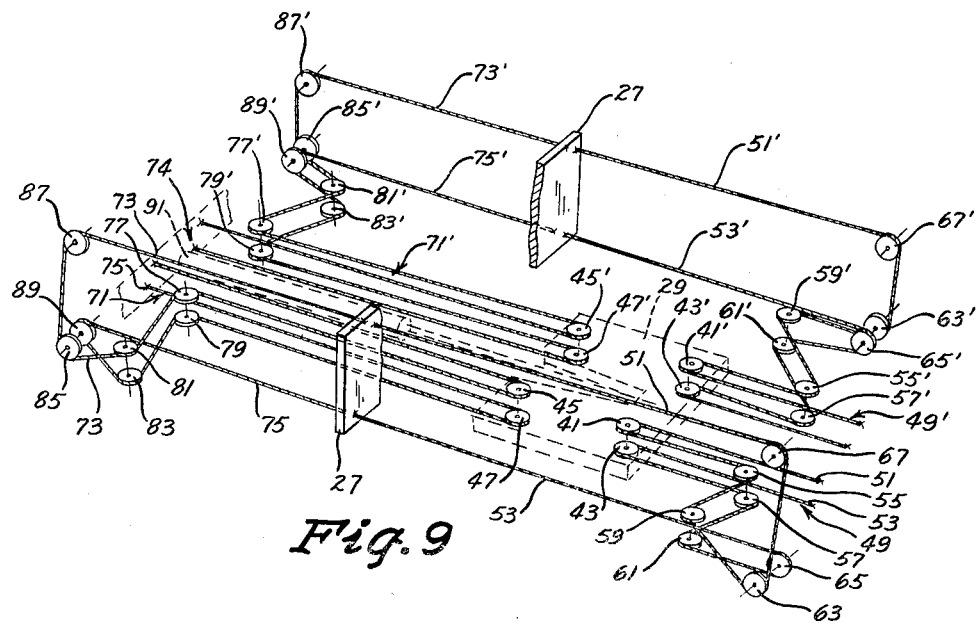
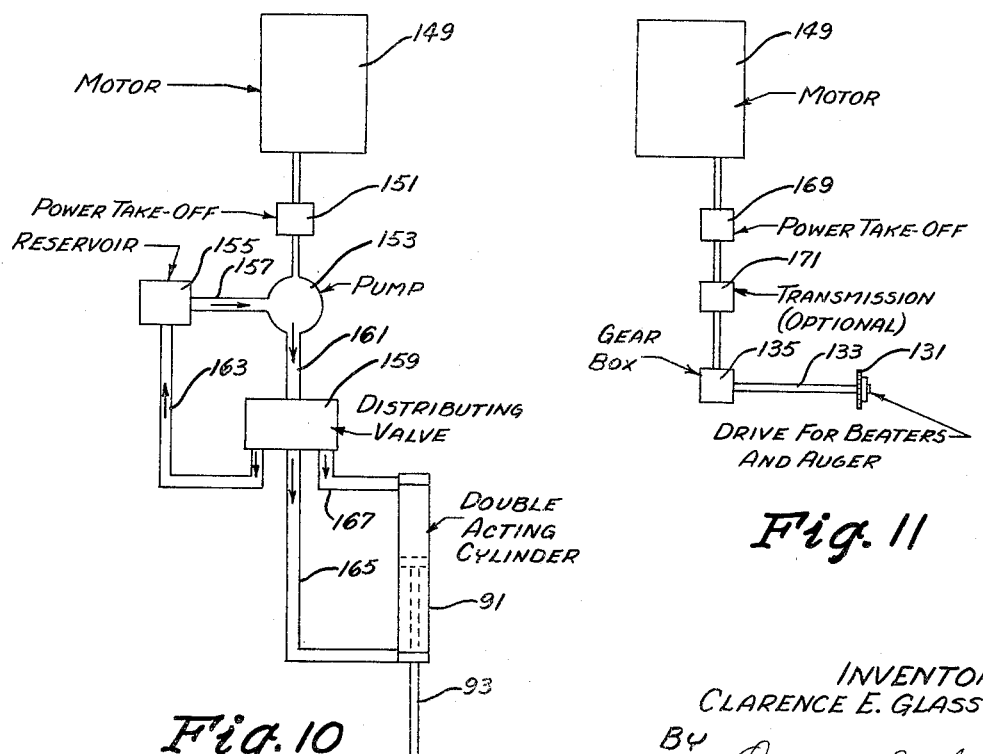

Oct. 12, 1965  C. E. GLASS  3,211,308
SELF-UNLOADING TRUCK BODY

Filed May 7, 1964  4 Sheets-Sheet 4

INVENTOR
CLARENCE E. GLASS
BY
Deck & Zarley
ATTORNEYS

United States Patent Office 3,211,308
Patented Oct. 12, 1965

3,211,308
SELF-UNLOADING TRUCK BODY
Clarence E. Glass, R.R. No. 1, Memphis, Mo.
Filed May 7, 1964, Ser. No. 366,227
4 Claims. (Cl. 214—82)

This invention pertains to a self-unloading truck body and more particularly to a self-unloading truck body having an end gate movably mounted in said body transversely to the longitudinal axis thereof.

The idea of moving an end gate to unload a truck body is not new. However, the existing devices are completely inadequate and unsatisfactory. The end gates do not move smoothly and have a tendency to bind and cause damage to the mechanisms. The trucks utilizing movable end gates must be fabricated in such a manner that they are impractical to be used for any operation other than feeding cattle or the like. Frequently the devices may only be mounted on a particular type or make of truck.

Additionally, the devices existing today do not permit the driver to observe the feed being unloaded. Also, the end gate and beaters are operated from a single power take-off which necessarily reduces the available power and does not permit the operator to adequately control the speed of the beaters or end gate individually.

Also any unloading truck body should be convenient to operate, safe to use, and have the necessary controls and safety features available to prevent injury to individuals or damage to equipment.

Therefore a principal object of this invention is to provide a self-unloading truck body which may be used for feeding cattle in bunks and mangers as well as for general trucking purposes.

A further object of this invention is to provide a self-unloading truck body which may be installed on any make or model truck.

A further object of this invention is to provide a self-unloading truck body which insures smooth operation of the end gate to prevent damage to equipment.

A further object of this invention is to provide a self-unloading truck body which has separate power take-offs for driving the beaters, etc. and for moving the end gate.

A further object of this invention is to provide a self-unloading truck body which permits the driver to observe the unloading operation at all times.

A further object of this invention is to provide a self-unloading truck body which permits the driver to control the beaters and end gate separately and individually.

A further object of this invention is to provide a self-unloading truck body which has the necessary controls therefor conveniently located.

A further object of this invention is to provide a self-unloading truck body which does not require any alteration in the width, length or height of the truck body specifications.

A further object of this invention is to provide a self-unloading truck body which is safe to operate.

A further object of this invention is to provide a self-unloading truck body which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 4 is a top elevational view of the device with portions thereof cut-away to more fully illustrate the invention;

FIG. 5 is a sectional view of the device as seen on line 5—5 of FIG. 4 at an enlarged scale with portions thereof cut-away to more fully illustrate the invention;

FIG. 6 is a sectional view as seen on line 6—6 of FIG. 4, at an enlarged scale;

FIG. 7 is a sectional view of the device as seen on line 7—7 of FIG. 1, at an enlarged scale;

FIG. 8 is a sectional view of the device as seen on line 8—8 of FIG. 7, at a reduced scale;

FIG. 9 is a perspective schematic drawing of the pulley arrangement for moving the end gate;

FIG. 10 is a schematic drawing of the means of operating the hydraulic cylinder;

FIG. 11 is a schematic drawing of the means for operating the beaters and auger;

Figure 1:
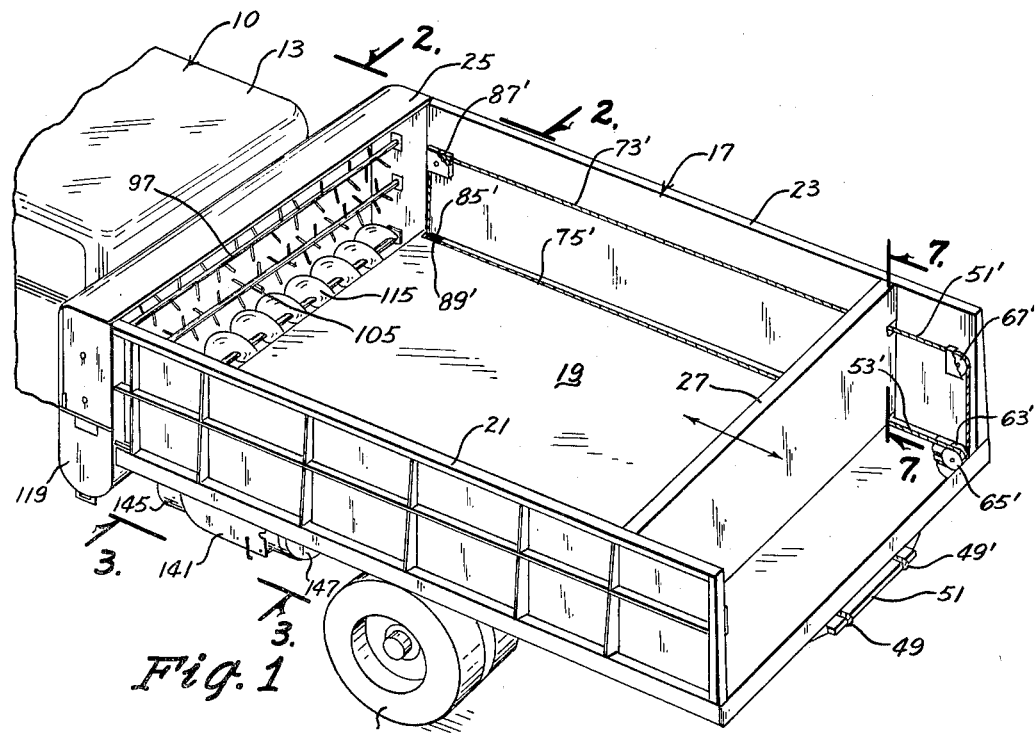
FIG. 1 is a perspective view of the device mounted on a truck with portions thereof cut-away to more fully illustrate the invention.

The numeral 10 generally designates a vehicle having frame members 11 and 11', cab 13 and wheels 15. Rigidly secured to frame members 11 and 11' are side channels 12 and 12' respectively which support body 17 having a bed 19, sides 21 and 23, forward end 25 and an end gate 27 movably mounted therein transversely to the longitudinal axes of bed 19.

A cross-head 29 is slidably movable along a portion of the length of side channels 12 and 12', as illustrated in FIGS. 4 and 6. Cross-head 29 is comprised of vertical side members 31 and 33 having a top portion 35 and bottom portion 37 extending therebetween in spaced relationship to each other. Cross-head 29 has a cutaway area 38 extending rearwardly from its forward end. It will be noted that side channels 12 and 12' each have secured thereto by welding or the like, rod members 39 which are located inwardly from side members 31 and 33 of cross-head 29.

Horizontally disposed pulleys 41 and 43 are rotatably mounted on cross-head 29 between top 35 and bottom 37 at its rearward end adjacent side channel 12. Horizontally disposed pulleys 45 and 47 are rotatably mounted on cross-head 29 between top 35 and bottom 37 at the forward end thereof adjacent to side channel 12. Pulleys 41', 43', 45' and 47' are mounted on the other side of cross-head 29 identical to pulleys 41, 43, 45 and 47 and will not be again described. Inasmuch as the pulley arrangement is identical on each side of the device, only one side will be described with "prime marks" indicating corresponding structure on the drawings.

A cable 49 is secured intermediate its length by any convenient means, to bar 51 which extends between and is secured to side channels 12 and 12'. Cable 49 loops around bar 51 as illustrated in FIG. 1. For purposes of description, cable 49 will be described as cables 51 and 53. Cable 51 will designate the upper part of cable 49 as it extends forwardly from bar 51. Cables 51 and 53 first extend forwardly from bar 51 and engage pulleys 41 and 43 respectively, at the inner, forward and outer sides thereof. Cables 51 and 53 then extend rearwardly to horizontally rotatable pulleys 55 and 57 respectively, which are vertically disposed, and extend around the inner and rearward side thereof. Cables 51 and 53 then extend outwardly and forwardly and engage the forward and outer portions of horizontally rotatable pulleys 59 and 61 which are secured to the underside of body 17 and are vertically disposed with respect to one another. Cables 51 and 53 then extend rearwardly towards vertically rotatable pulleys 63 and 65 which are rotatably secured to body 17. Cable 51 passes around the lower and rearward portions of pulleys 63 and extends upwardly therefrom along the inside of side member 21 to vertically rotatable pulley 67 whereupon it passes around the rearward and top portions thereof and extends forwardly to the upper portion of end gate 27 and extends therethrough and is secured thereto by means of fastener 69 bolted to end gate 27 as illustrated in FIG. 7. Cable 53 passes around the lower, rearward and upper portions of pulley 65, which is the innermost pulley of pulley 63 and 65, and then extends forwardly to end gate 27 where it extends clear into and is secured thereto by means of fastener 69 being bolted to end gate 27 as illustrated in FIGS. 7 and 8.

Cable 71 is a continuous cable and is secured to crossmember 74 extending between side channels 12 and 12'. Cable 71 will be described as being comprised of upper cable 73 and lower cable 75 as it extends rearwardly from cross-member 74. Cables 73 and 75 first extend rearwardly from cross-member 74 to pulleys 45 and 47. Cables 73 and 75 extend around the inner, rearward and outer portions of pulleys 45 and 47 respectively, then extend forwardly and pass around the inner and forward sides of substantially horizontal rotatable pulleys 77 and 79 respectively. Cables 73 and 75 then extend outwardly and slightly rearwardly to horizontally rotatable pulleys 81 and 83 where they extend around the rearward and outer portions thereof. Cable 73 then extends forwardly to vertically rotatable pulley 85 where it extends around the lower and forward portions thereof, thence upwardly to vertically rotatable pulley 87 which is rotatably secured to the inside surface of side 21. Cable 73 extends around the forward and top portions of pulley 87 and then extends rearwardly to end gate 29 and is secured thereto by means of fastener 69 as illustrated in FIG. 6. Cable 75 extends forwardly from pulley 83 to vertically rotatable pulley 89 which is rotatably secured to the forward end of bed 19. Cable 75 extends around the lower, forward and upper portions of pulley 89 and then extends rearwardly along bed 19 to end gate 27 where it is secured thereto by means of fastener 69.

A hydraulic cylinder 91 of the double acting type has its base secured to cross-member 74 by any convenient means and extends horizontally rearwardly therefrom. Piston rod 93 of cylinder 91 is secured to cross-head 29 by means of bolts 95 or other convenient means.

Beater 97, comprised of an elongated shaft 99 and having a plurality of teeth 101 extending outwardly therefrom, is rotatably mounted on body 17 adjacent forward end 25. Beater 97 has one end thereof rotatably secured to side 21 and its other end rotatably mounted in side 23 and extending outwardly therethrough and has a sprocket 103 mounted on its outer end.

A beater 105 comprised of an elongated shaft 107 and having a plurality of teeth 109 extending outwardly therefrom, is rotatably mounted on body 17 adjacent forward end 25. Beater 105 has one end thereof rotatably secured to side 21 and its other end rotatably mounted in side 23 and extending outwardly therethrough and has sprockets 111 and 113 mounted on its outer end.

An auger 115 is rotatably mounted in channel 117 of body 17 as illustrated in FIG. 1. Channel 117 extends through side 21. A gate member 119 is slidably mounted on the outside surface of side 21 to close the open end of channel 117 at times. Auger 115 is comprised of a shaft 121 having a spiral blade 122 secured thereto. One end of shaft 121 is rotatably mounted in side 23 and extends therethrough and has sprockets 123 and 125 mounted on its outer end.

A chain 127 extends around sprockets 103 and 111. A chain 129 extends around sprockets 113 and 125. A chain 126 extends around sprocket 123 and sprocket 131 which is mounted on the outer end of a drive shaft 133 extending from gear box 135. A cover 134 is hingedly secured to body 17 to shield the sprockets and chains just described.

The other end of auger 115, which is adjacent the open end of channel 117, has shaft 121 adapted to receive a universal joint 131 which is operatively connected to an auger 139. Auger 139 is maintained in the position shown in FIG. 5 by U-shaped chute 141 having handle 142 mounted thereon which is secured to the outer surface of side 21 by hooks 143 or other convenient means.

Figures 2, 3:
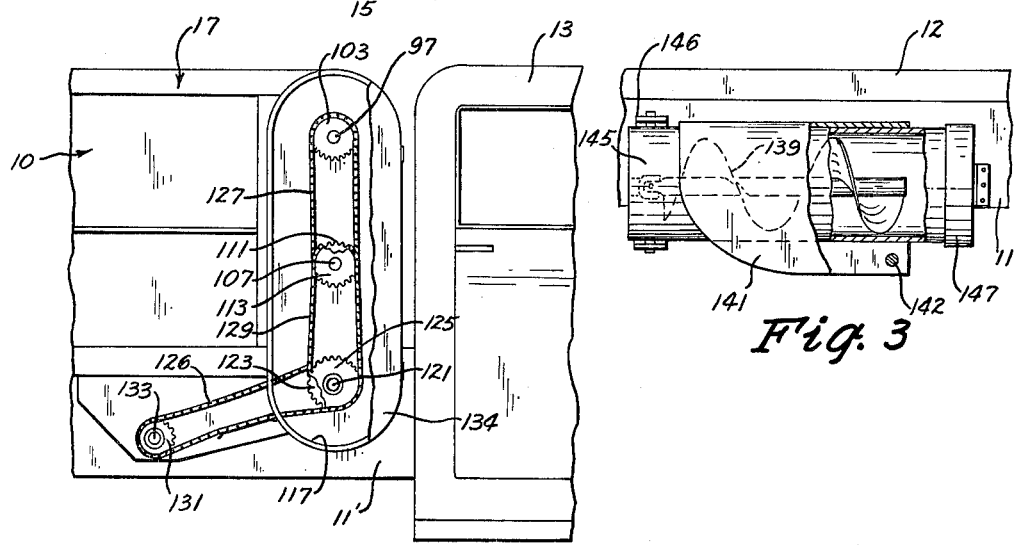
FIG. 2 is a sectional view of the device as seen on line 2—2 of FIG. 1, at an enlarged scale.
FIG. 3 is a sectional view of the device as seen on line 3—3 of FIG. 1 at an enlarged scale with portions thereof cut-away to more fully illustrate the invention.

Auger 139 is adapted to be received within cylinder 145, having an open end, which has one end hingedly secured to frame member 11 by means of bracket 146 as shown in FIG. 3. A cover 147 is hingedly secured to frame member 11 and is adapted to embrace the open end of cylinder 145 when cylinder 145 has been hingedly moved inwardly to a position adjacent frame member 11 for transportation purposes. Chute 141 slidably embraces cylinder 145 when being transported as is illustrated in FIGS. 1 and 3.

With respect to FIG. 10, the numeral 149 designates the vehicle motor which operates a power take-off 151 in conventional fashion. Power take-off 151 is operatively connected to a pump 153 which is connected to a fluid reservoir 155 by means of conduit 157. Pump 153 is also operatively connected to a distributing valve 159 by means of conduit 161. Distributing valve 161 is of the three-way variety and is connected to reservoir 155 by means of conduit 163. Distributing valve 159 is also connected to one end of the double acting cylinder 91 by means of conduit 165. Distributing valve 161 is also connected to the other end of cylinder 91 by means of conduit 167.

Motor 149 also drives a second power take-off 169 as illustrated in FIG. 11. Power take-off 169 is operatively connected to a transmission 171 (which is optional), which is in turn operatively connected to gear box 135. The device illustrated in FIG. 11 is used to drive beaters 97 and 105 and auger 115.

Preferably distributing valve 161 will be located within cab 13 for convenience. Suitable controls for operating the power take-offs 151 and 169 will also be located in cab 13.

Figure 12:
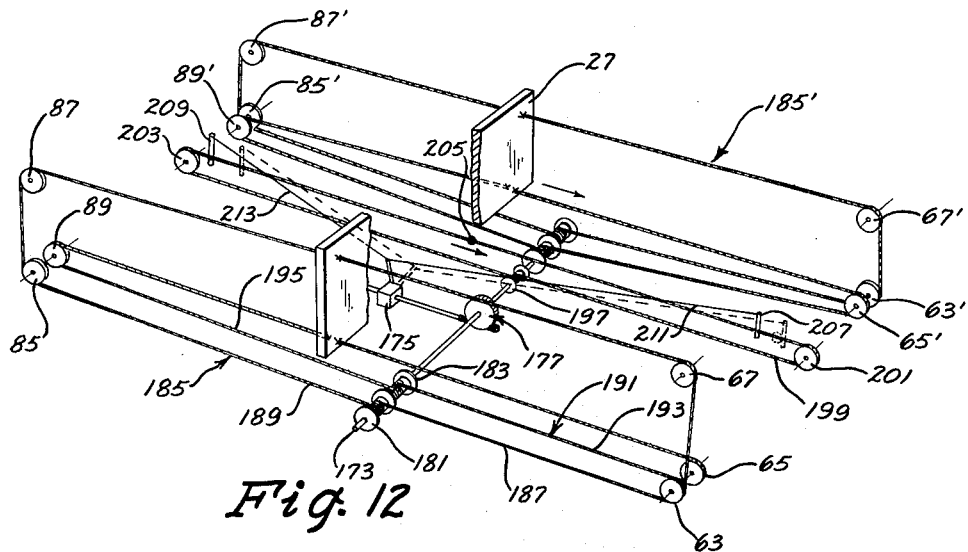
FIG. 12 is a perspective schematic drawing of an alternate means of moving the end gate.
Figure 13:
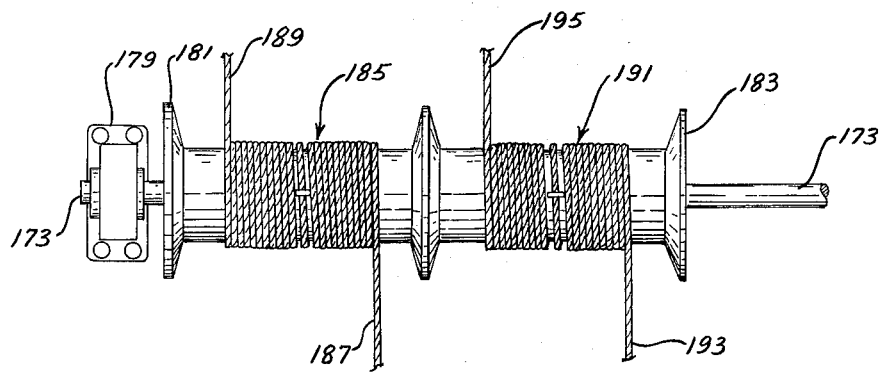
FIG. 13 is an enlarged view of a portion of the device seen in FIG. 12.

FIG. 12 illustrates an optional means of moving end gate 27. Pulleys 63, 63', 65, 65', 67 and 67', 85, 85', 87, 87', 89 and 89' remain the same as illustrated in FIG. 9.

Power take-off 151 would be used to rotate shaft 173 through a clutch throw-out 175 and gear drive 177 as illustrated in FIG. 12. Shaft 173 has its ends rotatably mounted in bearings 179 which are secured to the vehicle or body by any convenient means. Spools 181 and 183 are mounted on shaft 173 adjacent its outer end. Since both sides of the device are identical, only one side will be described with "prime marks" indicating duplicate structure.

A cable 185 is wound around spool 181 and extends forwardly and rearwardly therefrom. For purposes of description the rearwardly extending cable will be designated 187 and the forwardly extending cable will be designated 189. Cable 187 extends rearwardly from spool 181 and extends around the lower and rearward portions of pulley 63 and thence upwardly. Cable 187 extends around the rearward and top portions of pulley 67 and then extends forwardly to end gate 27 where it is secured thereto in the manner previously described. Cable 189 extends forwardly from spool 181 and extends around the lower and forward portions of pulley 85 and thence upwardly to pulley 87 where it passes around the forward and top portions thereof and thence extends rearwardly to end gate 27 where it is secured thereto in the manner previously described.

A cable 191 is wound around spool 183 and extends forwardly and rearwardly therefrom. For purposes of description, the rearwardly extending cable will be designated 193 and the forwardly extending cable will be designated 195.

Cable 193 extends rearwardly from spool 183 and extends around the lower, rearward and upper portions of pulley 65 and then extends forwardly to end gate 27. Cable 195 extends forwardly from spool 183 and extends around the lower, forward and upper portions of pulley 89 and thence forwardly to end gate 27 where it is secured thereto in the manner previously described.

A spool 197 is mounted on shaft 173 and has a cable 199 secured thereto. Cable 199 is wound around and secured to spool 197 in the same manner as cable 185 is wound around and secured to spool 181. Cable 199 extends from the top portion of spool 197 rearwardly to pulley 201 which is rotatably secured to body 17 or other suitable support. Cable 199 extends around the lower, rearward and upper portions of pulley 201 and then extends forwardly to pulley 203 which is also rotatably secured to body 17. Cable 199 extends around the upper, rearward and bottom portions of pulley 203 and then extends rearwardly to spool 197.

A ball 205 or other suitable object is secured to cable 199 between pulleys 201 and 203 and is adapted to engage arms 207 or 209 which are slidably secured to the underside of body 17 or other suitable support. A linkage arm 211 extends from arm 207 to throw-out clutch 175. A linkage arm 213 extends from the arm 209 to throw-out clutch 175.

The normal method of operation is as follows:

Motor 149 would be running and power take-off 151 and power take-off 169 would be activated by means of suitable controls within cab 13 of truck 10. Power take-off 151 powers pump 153 which is connected to distributing valve 159 and reservoir 155. Distributing valve 159 is also controlled from within cab 13 and has the ability to direct hydraulic fluid from pump 153 to either end of hydraulic cylinder 91. When it is desired to extend piston rod 93 rearwardly, distributing valve is placed in such a position so that fluid will be supplied from pump 153 into cylinder 91 via conduit 161, valve 159 and conduit 167. When it is desired to move piston rod 93 into cylinder 91, valve 159 is placed in a position so that fluid will be supplied to cylinder 91 via conduit 165. Valve 159 has a built in by-pass feature that permits fluid to circulate from pump 153 into valve 159 by means of conduit 161 and then back into reservoir 155 by way of conduit 163 and then back into pump 153 by means of conduit 157. Such a by-pass feature prevents damage to the equipment when end gate 27 has reached its limits of movement or if the equipment should somehow become jammed.

With respect to FIG. 11, motor 149 would operate power take-off 169 which would be operatively connected to transmission 171 (optional) which in turn would be operatively connected to gear box 135. Transmission 171 is desirable when different speeds of beaters 97, 105 and auger 115 are needed without speeding up motor 149. Gear box 135 provides the necessary gear ratio to satisfactorily drive beaters 97, 105 and auger 115. Thus by operating power take-off 169, beaters 97, 105 and auger 113 would be caused to rotate in a counter-clockwise direction when viewed from side 23 as seen in FIG. 2. Therefore, it can be seen that the beaters and auger can be controlled separately from end gate 27 and the operation of one does not depend on the other.

Auger 139, when not in use, would be transported in cylinder 145 as seen in FIG. 3. When it is desired to remove auger 139 from cylinder 147, cover 147 is simply hingedly moved rearwardly to permit the removal of the same. Cylinder 145 would then be hingedly moved so that the open end thereof would be in a position such as seen in FIG. 4. Gate 119 would be moved upwardly and U-shaped chute 141 would be connected to the outside surface of side 21 by means of hooks 143 and would extend slightly upwardly as seen in FIG. 5. Auger 139 would then be connected to auger 115 by simply sliding universal joint 131 into shaft 121 of auger 115. The device is then ready to operate. It can be appreciated that the position of the outer end of chute 141 permits the driver to observe the material being discharged from body 17 through chute 141 at all times.

End gate 27 would ordinarily be in a position where it is adjacent the rearward end of body 17 such as illustrated in FIG. 1. Body 17 would be loaded in any suitable manner with silage, feed, etc. When it is desired to discharge the material in body 17 into a bunk, manger, etc. the driver would initially position auger 139 and chute 144 as previously described. Beaters 97, 105 and auger 115 would be caused to rotate by engaging power take-off 169. The beaters 97 and 105 would in effect mix the material and force the same down into auger 115 where it would be caused to move laterally outwardly along channel 117 and chute 141. The material would be forced into the beaters and auger by end gate 27 moving forwardly and pushing the material thereinto. End gate 27 is caused to move forwardly by activating power take-off 151 and moving distributing valve 159 to a position where it would cause hydraulic fluid to be passed to the forward end of cylinder 91 which would cause piston rod 93 to be extended.

The rearward movement of piston rod 23 will cause cross-head 29 to slidably move rearwardly along side channels 12 and 12' as illustrated in FIG. 6. Rods 39 prevent inwardly buckling or collapse of cross-head 29 should an obstacle be met. Without rods 39, vertical end members 31 and 33 would be caused to move inwardly as pressure was exerted on cross-head 29 if cross-head 29 were to become jammed.

As cross-head 29 moves rearwardly it can be appreciated that cables 71 and 71' will be effectively shortened through the various pulley arrangement previously described. Simultaneously with the effective shortening of cables 71 and 71' will be the effective lengthening of cables 49 and 49'. Because cables 71 and 71' each are in effect double cables and were each described as cables 73 and 75, it can be seen that end gate 27 will be pulled forwardly at four points. Cables 73 and 75 will be pulling on end gate 27 at its upper and lower ends adjacent side 21 while cables 73' and 75' will be pulling on end gate 27 at its upper and lower ends adjacent side 23. The pulling effect just described is extremely important. The uniform pulling on end gate 27 from the four points just described prevents end gate 27 from becoming jammed or binding on body 17 as it is being moved. It has been discovered that when end gate 27 is pulled solely from the bottom portion or from the upper portion the end gate continually binds and damages the equipment as well as preventing smooth operation of the device.

When end gate 27 reaches its forwardmost point of travel, distributing valve 159 permits a bypass of the hydraulic fluid to prevent cylinder 91 from exerting further pressure on piston rod 23 and cross-head 29 and possible resultant damage to the equipment. If end gate 27 should be stopped by some obstacle in body 17, the bypass in valve 169 will also prevent damage to the equipment.

It can be appreciated that when end gate 27 is desired to be moved rearwardly, valve 159 is placed in a suitable position so that piston rod 93 is moved forwardly into cylinder 91. Such forward movement of piston rod 93 causes cables 49 and 49' to be effectively shortened while cables 71 and 71' are being simultaneously effectively lengthened.

End gate 27 could be utilized to cause material to be dumped or pushed from the rearward end of body 17 by moving end gate 27 rearwardly as just described.

FIG. 12 illustrates an alternate method of moving end gate 27 without the aid of a hydraulic cylinder 91. In such an embodiment, power take-off 151 would operate the gear drive 177 shown in FIG. 12. A clutch throw-out 175 would be imposed between power take-off 151 and gear drive 177 for safety purposes. Inasmuch as both sides of the embodiment are the same only one will be described. It is obvious that when power take-off 151 is operated, shaft 173 will be caused to rotate about its axis. As shaft 173 rotates in one direction, cables 189 and 195 will be fed from spools 181 and 183 while cables 187 and 193 will be fed onto spools 181 and 183. As shaft 173 rotates in the opposite direction, cables 189 and 195 will be fed onto spools 181 and 183 while cables 187 and 193 will be fed from spools 181 and 183. Thus it can be realized that through the pulley arrangement of FIG. 12 previously described, as cables 189 and 195 are being fed onto spools 181 and 183 by the rotation of shaft 173, end gate 27 will be moved forwardly. As cables 187 and 193 are being fed onto spools 181 and 183 by the reverse rotation of shaft 173, end gate 27 will be moved rearwardly.

As shaft 173 rotates, cable 199 will also be moving on its pulley arrangement previously described. Ball 205 will have been so positioned on cable 199 that when end gate 27 reaches its most rearward position, ball 205 will engage arm member 207 which will cause linkage 211 to disengage clutch throw-out 175. When end gate 27 has been moved to its most forward position, ball 205 will engage arm 209 to disengage clutch throw-out 175 by means of linkage 213. Such a safety feature prevents damage to equipment when end gate 27 reaches its forward and rearward limits.

It is obvious that the device is designed with safety in mind. The cover 134 safely covers the various sprockets on beaters 97, 105 and auger 115. The shields on the various pulleys are an additional safety feature. The safety features previously described are obviously of great merit.

It can be seen that the device herein described is readily adaptable to any make or model of vehicle without extensive fabrication. It is not necessary to alter the specification of the truck body to incorporate the device into a truck body. It can also be appreciated that the device lends itself to a variety of ordinary trucking operations and is not limited to bunk and manger feeding operations. Thus from the foregoing it can be seen that the device accomplishes at least all of its stated objectives.

Some changes may be made in the construction and arrangement of my self-unloading truck body without departing from the real spirit and purpose of my invention, and it is my intention to cover by my claims, any modified forms of structure for use of mechanical equivalents which may be reasonably included within their scope.

I claim:
1. In combination with a vehicle, comprising,
a body mounted on said vehicle having a floor, sides and forward end,
a movable end gate in said body having rearward and forward sides,
a first cable having its ends secured to the rearward side of said end gate adjacent one end thereof,
a second cable having its ends secured to the rearward side of said end gate adjacent the other end thereof,
a third cable having its ends secured to the forward side of said end gate adjacent one end thereof,
a fourth cable having its ends secured to the forward side of said end gate adjacent the other end thereof,
a hydraulic cylinder secured to said vehicle and having an extendable piston rod,
a cross-head secured to the outer end of said piston rod,
said cross-head having a plurality of pulleys rotatably mounted thereon,
said pulleys on said cross-head engaging said first, second, third and fourth cables to move said end gate in one direction when said piston rod is withdrawn into said hydraulic cylinder and to move said end gate in an opposite direction when said piston rod is extended,
and means for extending and withdrawing said piston rod with respect to said hydraulic cylinder,
said body having a plurality of double pulleys rotatably secured thereto adjacent its rearward and forward ends at each side thereof below said floor,
said first, second, third and fourth cables engaging said double pulleys adjacent thereto at a point between said end gate and said cross-head.

2. In combination with a vehicle, comprising,
a body mounted on said vehicle having a floor, sides and forward end,
a movable end gate in said body having rearward and forward sides,
a first cable having its ends secured to the rearward side of said end gate adjacent one end thereof,
a second cable having its ends secured to the rearward side of said end gate adjacent the other end thereof,
a third cable having its ends secured to the forward side of said end gate adjacent one end thereof,
a fourth cable having its ends secured to the forward side of said end gate adjacent the other end thereof,
a hydraulic cylinder secured to said vehicle and having an extendable piston rod,
a cross-head secured to the outer end of said piston rod,
said cross-head having a plurality of pulleys rotatably mounted thereon,
said pulleys on said cross-head engaging said first, second, third and fourth cables to move said end gate in one direction when said piston rod is withdrawn into said hydraulic cylinder and to move said end gate in an opposite direction when said piston rod is extended,
and means for extending and withdrawing said piston rod with respect to said hydraulic cylinder,
said body having a plurality of double pulleys rotatably secured thereto adjacent its rearward and forward ends at each side thereof below said floor and a single pulley rotatably secured to each side of said body adjacent its rearward and forward end above said floor,
said first, second, third and fourth cables engaging said double pulleys and said single pulley adjacent thereto at a point between said end gate and said cross-head.

3. In combination, a self-unloading vehicle body mounted on a vehicle frame,
said body having two horizontally extending side channels mounted on said frame,
said body having opposite sides, a floor, and rearward and forward ends,
a cross-head extending between said side channels and slidably mounted thereon having rearward and forward ends,
an end gate movably mounted in said body having rearward and forward sides,
a first pair of vertically spaced pulleys horizontally rotatably mounted on said cross-head at the rearward end thereof,
a second pair of vertically spaced pulleys horizontally rotatably mounted on said cross-head at the rearward end thereof,
a third pair of vertically spaced pulleys horizontally rotatably mounted on said cross-head at the forward end thereof,
a fourth pair of vertically spaced pulleys horizontally rotatably mounted on said cross-head at the forward end thereof, said body carrying first, second and third double pulleys at one side thereof adjacent its rearward end, said body carrying fourth, fifth and sixth double pulleys at the other side thereof adjacent its rearward end, said body carrying seventh, eighth and ninth double pulleys at one side thereof adjacent its forward end, said body carrying tenth, eleventh and twelfth double pulleys at the other side thereof adjacent its forward end, said first, second, fourth, fifth, seventh, eighth, tenth and eleventh double pulleys being below said floor, said third, sixth, ninth and twelfth double pulleys being vertically rotatably mounted in said floor, first and second single pulleys vertically rotatably secured to one side of said body adjacent its rearward and forward ends respectively above said floor, third and fourth single pulleys vertically rotatably secured to the other side of said body adjacent its rearward and forward ends respectively above said floor, a first cable secured to the upper rearward side of said end gate at one end thereof extending rearwardly around said first single pulley thence downwardly around one pulley of said third double pulley thence around one pulley of said second double pulley thence around one pulley of said first double pulley thence around one pulley of said first pair of pulleys on said cross-head thence to an anchor point on said frame thence around the other pulley of said first pair of pulleys on said cross-head thence around the other pulley of said first double pulley thence around the other pulley of said second double pulley thence around the other pulley of said third double pulley thence forwardly to the lower rearward side of said end gate at one end thereof and being secured thereto, a second cable secured to the upper rearward side of said end gate at the other end thereof extending rearwardly around said third single pulley thence downwardly around one pulley of said sixth double pulley thence around one pulley of said fifth double pulley thence around one pulley of said fourth double pulley thence around one pulley of said second pair of pulleys on said cross-head thence to an anchor point on said frame thence around the other pulley of said second pair of pulleys on said cross-head thence around the other pulley of said fourth double pulley thence around the other pulley of said fifth double pulley thence around the other pulley of said sixth double pulley thence forwardly to the lower rearward side of said end gate at the other end thereof and secured thereto, a third cable secured to the upper forward side of said end gate at one end thereof extending forwardly and around said second single pulley thence downward and around one of the pulleys of said ninth double pulley thence around one pulley of said eighth double pulley thence around one pulley of said seventh double pulley thence around one pulley of said third pair of pulleys on said cross-head thence to an anchor point on said frame and thence to the other pulley of said third pair of double pulleys on said cross-head thence the other pulley of said seventh double pulley thence around the other pulley of said eighth double pulley thence around the other pulley of said ninth double pulley thence rearwardly to the lower forward side of said end gate at one end thereof and being secured thereto, a fourth cable secured to the upper forward side of said end gate at the other end thereof extending forwardly and around said fourth single pulley thence downwardly around one pulley of said twelfth double pulley thence around one pulley of said eleventh double pulley thence around one pulley of said tenth double pulley thence around one pulley of said fourth pair of pulleys on said cross-head thence to an anchor point on said frame thence around the other pulley of said fourth pair of pulleys on said cross-head thence around the other pulley of said tenth double pulley thence around the other pulley of said eleventh double pulley thence around the other pulley of said twelfth double pulley thence rearwardly to the lower forward side of said end gate at the other end thereof and being secured thereto, and means on said vehicle to move said cross-head rearwardly and forwardly in said side channels to move said end gate forwardly and rearwardly respectively.

4. The device of claim 3 wherein said means for moving said cross-head is comprised of a hydraulic cylinder having an extendable piston rod; said hydraulic cylinder being secured to said frame and having its piston rod secured to said cross-head.

References Cited by the Examiner
UNITED STATES PATENTS

| | | | |
|---|---|---|---|
| 2,694,499 | 11/54 | Mohrlang | 214—518 |
| 2,726,776 | 12/55 | Meyers | 214—82 |
| 2,931,529 | 4/60 | Osterhaus | 214—519 |
| 3,021,968 | 2/62 | Meyers | 214—82 |
| 3,047,174 | 7/62 | Kasten | 214—520 |

GERALD M. FORLENZA, *Primary Examiner.*